Patented June 5, 1928.

1,672,046

UNITED STATES PATENT OFFICE.

ADOLPH LAW VOGE, OF NEW YORK, N. Y.

FOOD PREPARATION.

No Drawing.   Application filed August 11, 1924. Serial No. 731,487.

The invention relates to methods of rendering available and administering the valuable tonic principle of the *Paullinia cupana* and consists in a novel process of treating portions of the plant and of a novel product or class of products thus produced.

Hitherto this plant has been utilized only in either of two ways. The chief use has been as a sort of baked bread or partially baked dough composed of starch, dry or parched ground fruit, and other constituents made into a dough with water and then kneaded and shaped into sticks about 3/4" to 1" diameter and about 6" or 8" long and smoked or baked at a very gentle heat and sold as guarana. This is the diluted form in which the material has entered into commerce, after which the characteristic tonic principle has been named "guaranine." For medicinal and other purposes the sticks are ground and the tonic principles extracted with alcohol to produce the fluid extract.

In all these methods many impurities are present and much of the valuable extractive matter is locked up in the particles of burst starch jelly. Some starch is even present in the fruit itself. Thus alcoholic extraction is ineffective and takes up too much tannin in proportion to the alkaloid dissolved and only the processes of digestion serve to fully liberate the desirable principles from the starch in which it is locked up when the ground baked bread is used.

I have found that the tonic principle of the Paullinia fruit is obtainable directly from the fruit itself provided the latter can be prevented from spoiling or decaying, as it ordinarily does with great ease and rapidity. It has generally been supposed that the Paullinia fruit could not be kept without decomposition except in the modified adulterated and baked form of guarana bread. Unlike corn, wheat and other grains and nuts, mere parching does not appear to destroy the enzymes that actively promote decay, or else some constituent of the Paullinia is more hydroscopic than those of other nuts and grains. I have discovered that small amounts of moisture taken up from the air superinduce this decay and that if the freshly parched and preferably still warm fruit is substantially hermetically sealed and thus kept dry, it may be kept for all practical purposes indefinitely without loss or alteration of the characteristic principle. Apparently the absence of moisture, while it does not destroy, indefinitely inhibits the action of these particular enzymes so I have, I believe, for the first time been able to preserve the pure fruit indefinitely.

I have furthermore discovered that, contrary to statements published regarding the guarana or bread, the characteristic principle of the fresh Paullinia fruit itself differs in effect and behavior from caffein, theobromine or mixtures thereof and is apparently more invigorating and less merely stimulant in its character. Furthermore, I have found that the best general effect of this characteristic principle is obtained by decoction rather than by alcoholic extract or by simple and complete ingestion of the whole fruit or guarana bread.

The preferred example of my process of treating the fruit is as follows:—Freshly gathered fruit or berries are parched at a gentle heat of about 150° F. for a period of about 24 hours or until thoroughly dry and reduced to almost brittle grains. This may be done as in coffee roasting (at gentle heat) or in any other suitable manner. These brittle grains may be dry ground at once or may be preserved and stored for shipment and later grinding but, in either case, should be carefully protected against humid air until ready for further processing. This protection I prefer to do in the case of the grain themselves or roughly ground material by sealing it dry in tins, jars or other substantially hermetic vessels, though I may use a suitable protective coating applied to the grain or the granule. In the case of finely ground material I prefer to protect it by thoroughly incorporating with it some less hydroscopic and more fatty or greasy body such as chocolate, milk powder, cocoa, coffee, tea, cola or the like. If coffee, tea or cola be used, however, I prefer that the required fat content be supplied by added materials or the mixture sealed.

In selecting the substance with which to incorporate the Paullinia, due consideration should be given to the composition and properties of the other substances as will be pointed out later. The finness of grinding of the dried Paullinia fruit or berry depends on the substance with which it is to be combined. For admixture with cocoa it is preferably ground exceedingly fine, with coffee and tea less so. To obtain this fine subdivision without water-wet grinding, which may cause decomposition, I prefer to mix about 1 or 2 parts of Paullinia with 6 parts of cocoa and about 8 parts by volume of a volatile solvent such as ethyl alcohol and to grind this mixture or dry pulp in a ball mill for about 10 hrs. The mill is then opened and about one-third part of soda ash, or other alkaline substance, and one-third part of agar-agar or similar colloiding agent which have been independently ground to dust either separately or together are added. The mill is then closed and run for a short period to thoroughly incorporate the added materials, after which the ethyl alcohol is recovered from the paste, leaving a dry crumbly cake which can be broken, shaved or powdered as convenient. Other suitable forms of dry grinding may be used provided the requisite degree of fineness is secured. This product I believe on account of the high fat content keeps well if properly tableted or packed in ordinary containers and may be sold and distributed in that form, forming one typical or preferred intermediate form of my product for commercial distribution.

The final step in my process, the one toward which all others are directed and with which they cooperate, is the extraction or solution of the essential tonic and sustaining principle by decoction which, so far as I am aware, has never before been practiced on the Paullinia in any form. This in the preferred form I carry out by boiling the finely ground and highly fattened powder with water which, in the presence of the fat, starch, sugar and albuminoids of the cocoa, serves to quite substantially dissolve and render available for ingestion all the essential tonic and valuable principles of the Paullinia without producing the bitter tannic taste that would characterize the aqueous decoction of the Paullinia fruit alone. During this boiling process the agar, solubilized starch, sugar and albuminoids serve to insure the suspension and even dispersion of any residual cellulosic matter, give full smoothness and body to the decoction and the cocoa contributes its characteristic pleasant aroma and flavor to the whole, while the tonic principle of the Paullinia at once effectively aids and assists by the direct stimulation caused by the theobromine and caffein. The soda serves to assist in harmonizing the whole suspension possibly by saponification of the fats and preventing acidity. The resulting mixture is a delightful drink, hot or cold, is reasonably stable like ordinary cocoa, coffee, tea or milk, highly tonic and sustaining, moderately stimulating and remarkably nourishing, giving a feeling of repletion that is surprising.

Other mixtures may be prepared either directly or indirectly. For instance the dried-milk-Paullinia combination contains the desired amount of fat and the casein provides a colloiding agent as well as the nourishing food material, and is well adapted to cold solution provided the Paullinia is finely enough divided to be well dispersed. The characteristic flavor and aroma of milk are sufficient to make the Paullinia palatable. Coffee or tea decoctions may likewise be made direct. A suitable solvent may be used to extract the essential principle from the Paullinia and this extract either before or after removal of solvent may be united with the cocoa, coffee, tea or to their decoction. The proper choice of solvent permits the separation of the tonic principle of the Paullinia in such form as to be free from the objectionable hygroscopic matter and therefore is moisture proof and adapted to stable preservation. Alcohol, however, is not a desirable solvent for this use since it appears to extract much of the tannin and hygroscopic matter as well as the tonic principles. I prefer to use acetone or similar agent and in this manner extract the tonic principles and enough of the fatty matter to assist in stabilizing and protecting it, without extracting much of the undesirable tannins. This acetone can then be removed in any desired way as by vacuum evaporation, absorption in bisulphite, or otherwise.

For a highly tonic milk, tea, or coffee Paullinia, I sometimes prefer to add the solids of the acetone extraction to the coffee, tea or milk, or I may for ordinary use mix the Paullinia slightly less finely ground with the coffee or tea and if desired supplement the fat content, particularly in the case of tea, by adding cocoa butter or the like and furthermore supplementing the carbohydrates by dextrin, and albuminoids with suitably prepared gelatin or the like. The presence, however, of so much larger quantities of starch and sugar in the Paullinia than are found in milk, tea, coffee or even in cocoa and the sustaining action of its tonic principles, peculiarly fit it for combination with these materials in the form of dry mixtures or in decoctions and the need of fat addition to the coffee or to the tea is reduced because the conditions of hermetic packing necessary and commonly practiced to preserve the aroma of tea or coffee are generally suitable to prevent the access of moisture to this Paullinia.

While I have described my invention in great detail because of its many applications and advantageous uses, it will be obviously impossible to indicate all applications or equivalent procedure in treating and preparing the essential principles of Paullinia for practical use and application in accordance with my invention and I do not limit myself to the specific illustrations given.

I claim:

1. A new article of commerce consisting of the tonic principle of dehydrated Paullinia fruit and a material or materials adapted to yield odor and flavor.

2. A new article of commerce consisting of the tonic principle of dehydrated Paullinia fruit and a material or materials adapted to yield odor and flavor on decoction.

3. A new article of commerce adapted to form a pleasant and invigorating beverage comprising a material or materials adapted to yield odor and flavor and the tonic principle of dehydrated Paullinia fruit extracted by decoction.

4. A preparation adapted to produce a beverage by decoction without alcohol or objectionable tannin content comprising dehydrated *Paullinia cupana* fruit mixed with a cacao product such as cocoa or chocolate.

In testimony whereof I have hereto set my hand on this ninth day of August, 1924.

A. LAW VOGE.